May 30, 1950 W. BROWN 2,509,721
EPICYCLIC CHANGE-SPEED GEAR
Filed June 6, 1947 3 Sheets-Sheet 1

INVENTOR
WILLIAM BROWN

May 30, 1950      W. BROWN      2,509,721
EPICYCLIC CHANGE-SPEED GEAR
Filed June 6, 1947      3 Sheets-Sheet 2
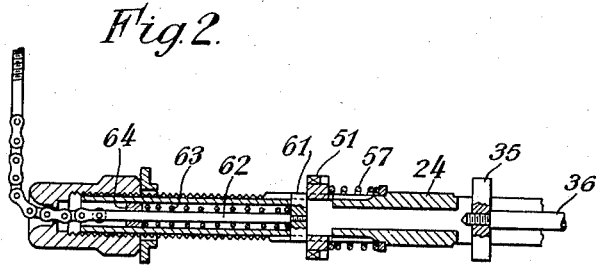
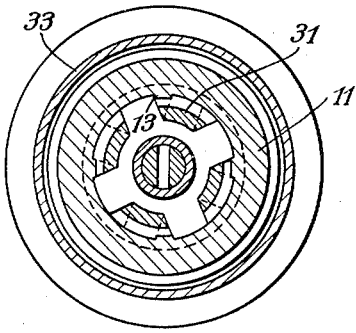
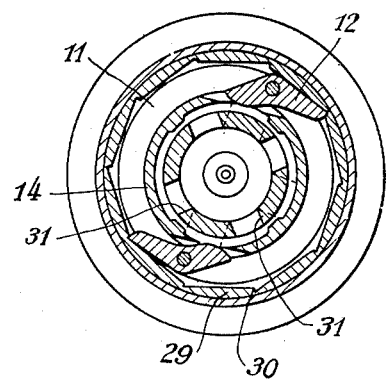

May 30, 1950     W. BROWN     2,509,721
EPICYCLIC CHANGE-SPEED GEAR

Filed June 6, 1947     3 Sheets-Sheet 3

INVENTOR
WILLIAM BROWN

BY *H. C. Bierman*
ATTORNEY

Patented May 30, 1950

2,509,721

UNITED STATES PATENT OFFICE 2,509,721

EPICYCLIC CHANGE-SPEED GEAR

William Brown, Nottingham, England

Application June 6, 1947, Serial No. 753,069
In Great Britain April 11, 1939

Section 1, Public Law 690, August 8, 1946
Patent expires April 11, 1959

5 Claims. (Cl. 74—766)

This invention relates to epicyclic change speed gears of the kind comprising two or more epicyclic gear trains with means for coupling them together for differential action and to driving, driven and stationary members, and wherein the annulus of one gear train is always coupled to the planet carrier of another gear train, and so that a direct drive and one differential increase ratio and one differential decrease ratio are obtainable.

Examples of epicyclic change speed gears of the kind aforesaid are described in the specifications of my prior United States Patent No. 2,168,600 and British Patent No. 519,945.

The invention is in fact an appreciation that the feature for providing one or more additional gear ratios of the invention described in the said British Patent No. 519,945 is applicable to other kinds of epicyclic change speed gear than therein described, including particularly the gear described in United States Patent No. 2,168,600.

According to the invention, an epicyclic variable speed gear comprising two epicyclic gear trains wherein the planet carrier of one gear train is always coupled to the annulus of the other and means for selectively coupling parts of the two epicyclic gear trains to driving, driven and stationary members with further coupling together of other parts of the two gear trains for providing both differential increase and decrease ratios is characterised by means for selectively coupling the said driving, driven and stationary members to the parts of one gear train so as to obtain also a normal gear ratio from such one gear train whilst the other gear train is idle.

In preferred examples of the invention, the improved gear is a development of the gear described in United States Patent No. 2,168,600 and embodies constructional details described in British Patent No 519,945.

In the drawings filed herewith:

Fig. 2 is a longitudinal section showing a modified arrangement of selector control within the axle, also a constructional detail from British Patent No. 519,945.

Fig. 4 is a cross section on line 4—4 of Fig. 1.
Fig. 5 is a cross section on line 5—5 of Fig. 1.

Fig. 6 is a perspective view of one of the pawls.

Figure 1:
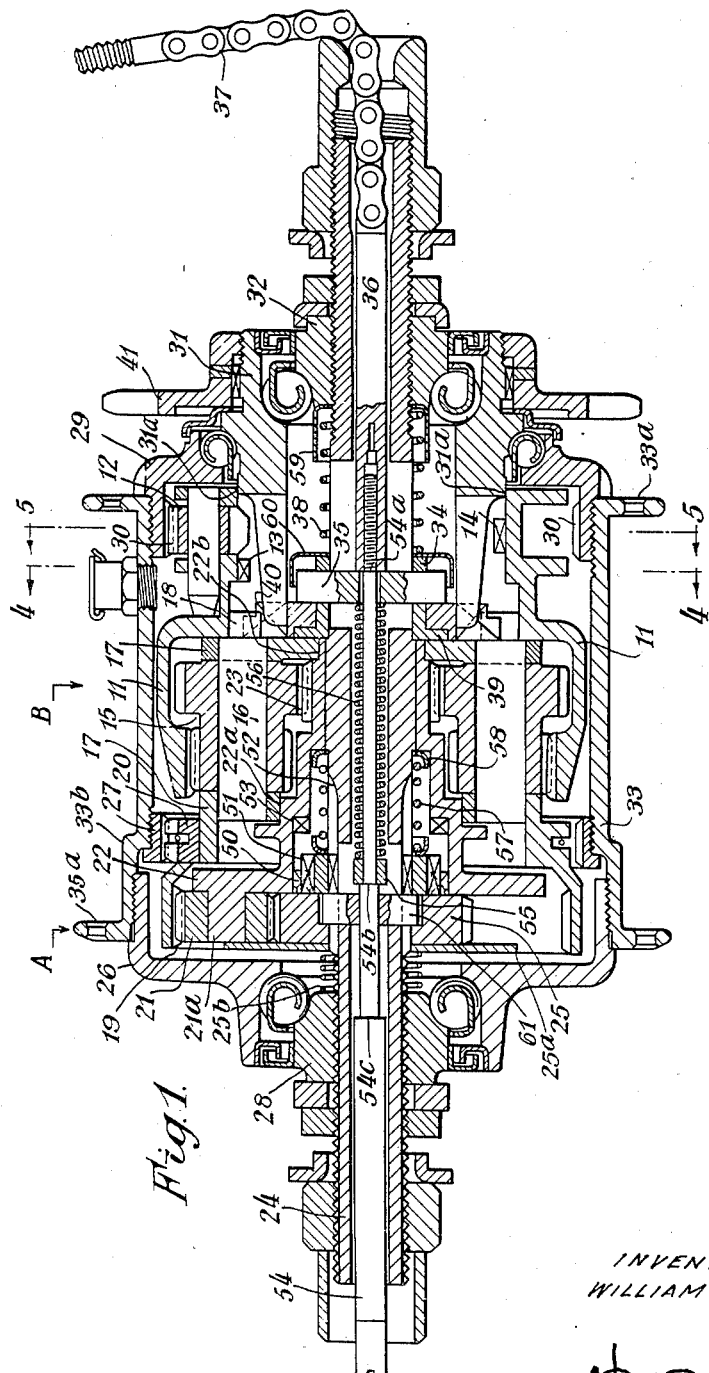
Fig. 1 shows in longitudinal section a gear according to United States Patent No. 2,168,600 modified with constructional details from one part of British Patent No. 519,945.

As illustrated in Fig. 1, the improved gear is constructed as a four speed cycle hub gear giving a direct drive, a differential increase, a differential decrease, and a fourth or wide decrease being a normal ratio from one of the gear trains.

As illustrated in Fig. 2, selector mechanism is provided enabling a fifth or higher ratio to be obtained being a normal ratio from the same single gear train.

As illustrated in Fig. 1, the epicyclic gear train B consists of an annular gear ring or annulus 11 extended at one end to provide a groove in which are mounted driving pawls 12, such extension having on its inner bore two sets of splines 13 and 14 in separate planes for alternative selection. The splines 13 and 14 are parallel and concentric to the axis of the gear ring but the two sets of splines are displaced angularly from each other so that the splines 14 lie between the spline 13 when viewed from the end. Meshing with the said annular gear ring 11 are double planet pinions 15 carried on pins 16 which are extended through bearings in a planet cage 17 to form driving dogs 18, adjacent to and in a separate plane from the aforesaid sets of splines. This planet cage 17 has an extension carrying driving pawls 20 and formed as an annulus 19 for the gear train A. Meshing with such annulus 19 are planet pinions 21 journaled on pins 21a mounted in a planet cage 22. This planet cage has formed on it, or attached to it, a sun pinion 23, which meshes with the planet pinions 15 so completing the epicyclic gear train B. The hub shell 33 is enlarged at 33b to receive the end piece 26 and a ratchet ring 27 screwed into the shell and adapted to be engaged by the pawls 20.

Concentric with the foregoing parts lies an axle 24 on which is rotatably mounted a pinion 25 which meshes with the planet pinions 21 so forming the solitary sun pinion and completing the epicyclic gear train A. The sun pinion 25 carries on its face dogs 50. The axle 24 has splines 52 formed in it, upon which splines is keyed a sliding dog 51 which can engage with the dogs 50 when required, so locking the pinion 25 to the axle, or freeing it at will.

Further, the planet cage 22 has formed in its bore, a set of dogs 53 which can also be engaged by the sliding dog 51 so locking planet cage 22 and pinion 23 to the axle or freeing it at will. A key 61 is provided passing through a slot in the axle 24 and located behind the sliding dog 51 and itself adapted to be engaged by a shoulder 54c for movement of the sliding dog, as described later.

Additional to key 35, rod 36, chain 37 and spring 38 (as described later) is a further rod 54 screwed into rod 36 and carrying three shoulders or steps 54a, 54b and 54c. The shoulder 54a butts against rod 36 when screwed home, and a collar 55 butts against shoulder 54b. Between the collar 55 and key 35 is a spring 56, such spring being stronger in its partly compressed position than the spring 38 in its fully compressed position. A further spring 57 acting against a collar 58 which rests against a shoulder on the axle 24 keeps the sliding dog 51 normally in engagement with the dogs 50 on the sun pinion 25 so locking it to the axle. Behind the sun pinion 25 is a disc 25a on the axle and backed by a spring 25b which prevents displacement of the pinion 25 when engaged by the sliding dog 51 under the action of the spring 57, and also operates to keep the other parts of the gear in their correct positions. The planet cage 22 is journaled at 22a and 22b into the planet cage 17 and also onto the periphery of the dogs 50 of the pinion 25, so making the assembly a concentric one with itself and with the axle 24 and providing good bearing surfaces. The piece 26 also supports the planet cage 17 by the ratchet ring 27, being journaled over the seating diameter of the pawls 20.

Further, the gear ring 11 is centralised by the extensions 18 on the planet pinions 16 engaging with its bore. The drive is taken from the left hand end of the gear by the driving pawls 20 to the ratchet teeth 27 operating in a forward direction secured direct to the hub shell. The supporting piece 26 is mounted on ball bearings to a cone 28 screwed to the axle. The drive is taken from the other end of the gear by the pawls 12 to another supporting piece 29 which carries ratchet teeth 30 also operating in a forward direction (see also Fig. 5). Carried in a ball journal in this supporting piece 29 is the driving member 31, which is further supported by a ball journal on a cone 32 screwed to the axle 24. An extension of the driving member 31 through the supporting piece 29 is journaled at 31a into the extension of the gear ring 11 so keeping it concentric with the axis of the whole assembly. Between and fixed to the two end supporting pieces 26 and 29 is mounted the shell 33 which performs the several functions of spacing the supporting pieces 26 and 29, forming a casing for the whole mechanism, and forming fixing flanges 33a for building a cycle wheel by means of spokes in the usual manner.

Also, on the axle 24 is slidably mounted a sleeve 34 operable by a key 35, rod 36 and chain 37 in known manner. A spring 38 acting between the sleeve 34 and the adjacent cone 32 is used to move the sleeve 34 to the left and movement in the other direction is obtained by a pull applied to the said chain 37. Between the ends of the spring 38 and the cone 32 is a sleeve 59 whilst between the other end of the spring 38 and the sleeve 34 is a cap 60. Rotatably mounted on the sleeve 34 and laterally positioned by a collar 39 formed on the sleeve and the said key 35, is a sliding dog 40 which engages with the driving member 31, being carried in a rotatable manner by it while still free to be moved laterally by the sleeve 34 and key 35. Also mounted on the driving member 31 in the application of the gear to a cycle hub, is a chain sprocket 41, the mounting being by splines in the example described, so that power can be transmitted to the driving member 31 by means of a chain from the usual bracket chainwheel (not shown).

In the normal position the combined spring effect is therefore to engage the sliding dog 51 with the dogs 50 of the pinion 25 so locking it to the axle, and the dog 40 with the driving dogs 18 so coupling the driving member 31 to the planet carrier 17. The dog clutch 40 can be moved to the right by pulling on the chain 37 so that it can engage with the splines 13, such movement being possible since the spring 56 is stronger than the spring 38. Further pulling on the chain 37 will next cause the dog 40 to engage with the splines 14. At this point the cap 60 against the sleeve 34 will come in contact with the sleeve 59 against the cone 32 and prevent any further movement to the right of the dog 40. At this point the shoulder 54c on the rod 54 will also butt against the key 61, so that by further pulling on the chain 37, the spring 56 will be compressed, pulling key 61 to the right and with it the dog 51. The dog 51 will, therefore, move out of engagement with the dogs 50 on the pinion 25 and into engagement with the dogs 53 on the combined planet carrier and sun pinion 22, 23, whilst still leaving the dog 40 engaged with the splines 14 of the solitary annulus 11, so giving gear ratios as described hereunder.

The complete epicyclic gear train is such that if a turning effort be applied to the driving dogs 18 on the planet carrier 17 the gear ring 11 will be carried round in the same direction at an increased speed, such speed being governed by the numbers of teeth in the gear ring 11 and sun pinion 23, and also by the fact that this sun pinion 23 is rotated in the same direction by action of the gear ring 19 (which is an extension of and rotates at the same speed as the planet carrier 17) acting on the planet cage 22 by means of the planet pinions 21 which mesh with gear ring 19 and sun pinion 25, which latter is dog clutched to the axle 24, which is held in a non-rotatable manner in the cycle frame in this instance. Since the shell 33 rotates faster than the planet carrier 17, the ratchet teeth 27 over-run the pawls 20 and there is no connection therefore between gear ring 19 or planet carrier 17 and the shell 33. This arrangement of the selectors gives a close ratio over drive for high gear.

For direct drive the dog 40 is moved to engage the splines 13 on gear ring 11. Power is transmitted by the member 31 through this dog to gear ring 11 by way of these splines. Since it has been shown that gear ring 11 rotates faster than the pinion carrier 17 at all times, this driving effort will be transmitted through the pawls 12, carried by gear ring 11 to the supporting piece 29 and so to the hub shell. Meanwhile, the gears are idling and the ratchet 27 will over-run its coacting pawls 20.

If, however, the turning effort be applied to gear ring 11 by the splines 14, and the pawls 12 disengaged from ratchet teeth 30, as hereinafter described, the pinion carrier 17 will be carried round in the same direction at a reduced speed, such speed being governed by the numbers of teeth in the gear ring 11 and sun pinion 23, and also by the fact that this sun pinion is rotated in the same direction by action of the gear ring 19 (which is an extension of and rotates at the same speed as the planet carrier 17) acting on the planet cage 22 by means of the planet pinions 21 which mesh ring 19 and sun pinion 25, which latter is dog clutched to the axle 24 as previously described.

If now in this latter gear position, the sun pinion 25 is disengaged from the axle and the planet carrier 22 and sun pinion 23 be fixed to the axle, by movement of the sliding dog 51, as previously described, the planet carrier 17 and with it the driven member will be carried round in the same direction at a further reduced speed, such speed now being governed by the numbers of teeth in gear ring 11, sun pinion 23, and planet pinions 15 only, the gear train A now being inoperative and the sun pinion 25 revolving idly on the axle.

This arrangement of the selectors gives a second low gear of wider ratio from the normal or fixed ratio.

In this construction it is to be observed that, as in the construction described in United States Patent No. 2,168,600 the increase indirect or differential gear ratio is greater than the decrease indirect or differential gear ratio. In the example described the planet pinions 15 are double pinions, but they can be of single pinions if required, the double pinions being used to give a particular gear ratio. Alternatively, the pinions 21 can be double pinions if this is necessary to give any other required ratio.

To demonstrate the close ratios and wider ratios which can be obtained by the improved construction, while using quite ordinary gear wheels, the following details are given. The gear ring 11, and sun pinion 23 have 56 and 20 teeth respectively while the double planet pinions 15 have 14 and 20 teeth respectively. The gear ring 19, the planets 21, and the sun pinion 25 have 60, 15 and 30 teeth respectively. With such gears top gear provides 9.2% increase over direct drive, first low gear provides 7.65% decrease and second low gear provides 20% decrease. With usual nomenclature gear ratios would therefore being approximately 80, 92½, 100 and 109.2.

The action of disengaging the pawls 12 is as follows:

In moving from engagement from the first splines 13 the dog 40 will first move laterally to a position behind the pawls 12 and will then rotate by virtue of the power communicated by the driving member 31 until it engages with the second set of splines 14 which are angularly displaced from the first splines. During this small arc of rotation no power is being transmitted from the driving member 31 to the gear assembly, and so the pawls 12 are not under load. These pawls which have hitherto transmitted the drive to the shell, are formed with chamfered tail pieces 42 (see Fig. 6) which are adapted to be engaged by the sliding dog 40 during this small arc of rotation so as to lift this end of the pawls to disengage the other end of the pawls by depressing them from the ratchet teeth of its coacting supporting piece 29. When such disengagement has been effected the dog 40 engages the second set of splines 14 and through them the drive is applied direct to the gear ring. The relationship of the pawl pivot pins of the pawls 12, the driving splines 14 and the width of the dog 40 is such that when the dog takes up its driving position against the splines 14 the pawls 12 are held out of engagement with the teeth 30 of the supporting piece 29.

It will be further noted that in changing from direct, drive to low gear as above described in the event of the driver member 31 being stationary and the hub shell rotating, so over-running both sets of pawls 12 and 20, the drag of the mechanism will cause the sliding dog 40 to take up a position on the non-driving face of the first set of splines 13. In this position the driving ends of the sliding dog 40 are immediately beside the tails of the pawls 12 and the chamfer 42 allows them to lift the pawls by direct lateral or axial movement and then when clear of the dogs 13 drop back from under the pawls to the non-driving face of the second set of splines 14. In taking up the drive again the sliding dog 40 will elevate the pawls 12 by their rearmost shape before driving on the splines 14 as previously described. The pawls 12 and 20 provide a free wheel action in all the gear ratios.

As shown in Fig. 2 the selector mechanism at the right hand end is the same as above described and as shown in United States Patent No. 2,168,600 the key 35 being positively secured to the rod 36. In place of the extension rod 54 however a further rod 62 is provided, fixed to the key 61, the rod being provided with a spring 63 which abuts against a collar 64 screwed into the axle. The rod is provided with the usual operating chain. The spring 63 is arranged to be stronger than the spring 57 and thus normally would hold the dog 51 in engagement with the dogs 53 on the planet carrier 22, to lock it to the axle 24. By pulling the rod 62 outwards (to the left) the dog 51 releases the part 22 and engages the dogs 50 to lock the pinion 25 to the axle. The fifth gear ratio thus provided direct from the gear train A, gives an increase ratio of 25%.

With the above construction it will be seen that the selector rod 36 can be operated to provide high, normal (direct) or low whilst the selector rod 62 decides whether the high or low shall be close ratio or wide ratio according to whether the pinion 25 or the planet carrier and pinion 22, 23 is held stationary respectively.

Figure 3:
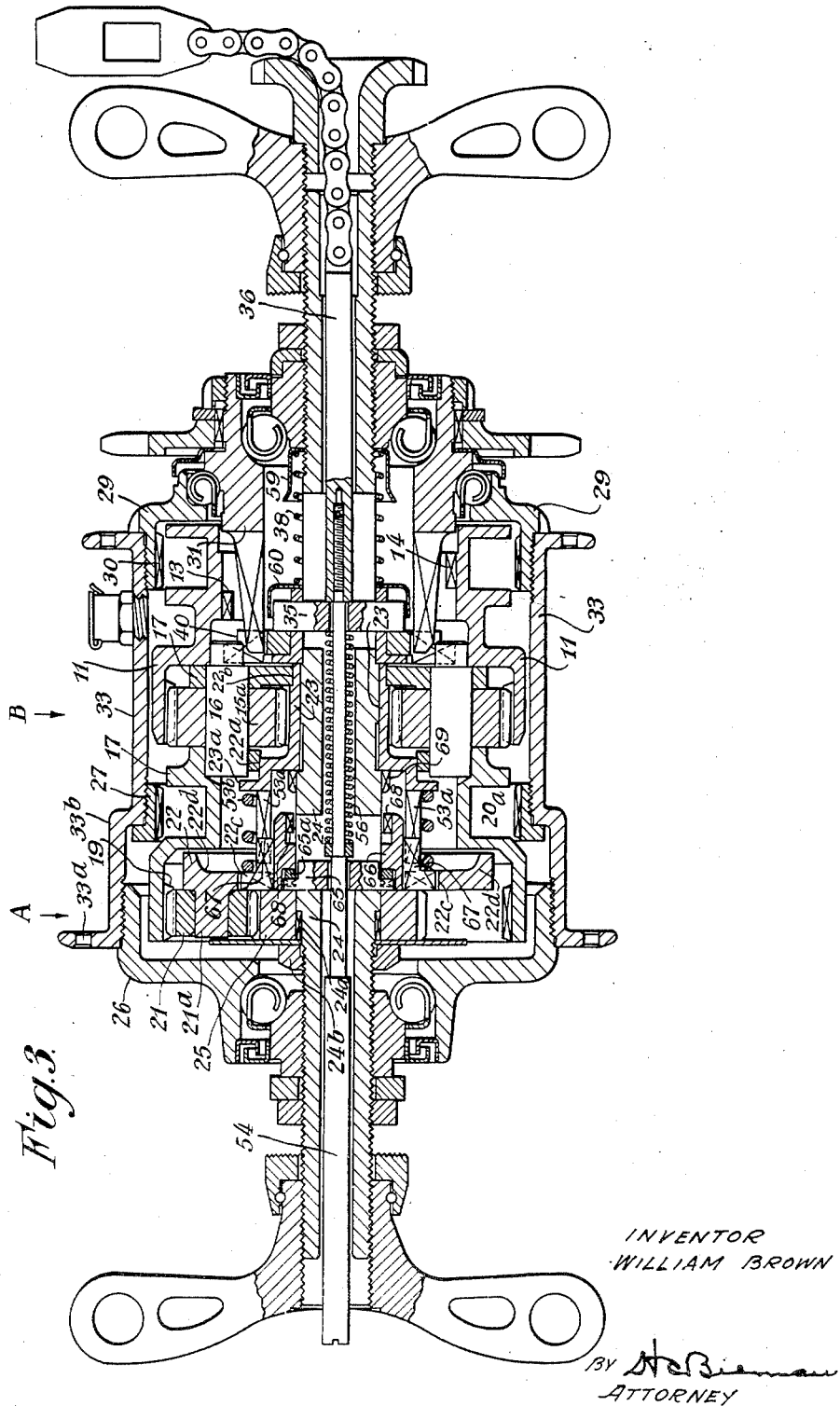
Fig. 3 shows in longitudinal section a gear according to United States Patent No. 2,168,600 modified with constructional details from another part of British Patent No. 519,945.

As shown in Fig. 3, the gear has many parts of the same construction as described and illustrated in Figs. 1, 4, 5 and 6 and such parts are for simplicity given the same reference numbers.

The following are the principal differences:

1. The sun pinion 25 is permanently secured by splines 24a and a nut 24b to the axle 24, and such sun pinion does not have the dog teeth 50 of the first example.

2. The planet carrier or cage 22 is severed from the sun pinion 23 and the disc-like back part of such cage is formed with a ring of internally cut teeth 22c. The pinion 23 is provided with long dogs 53a equivalent to the dogs 53 of the first example, whilst such dogs 53a extend to within a short distance of the said ring of internally cut teeth 22c of the cage 22. The pinion 23 is formed with a flange 23a which forms an abutment for a spring 53b carried on the dogs 53a and engaging the back face of the dogs 67 described below.

3. In place of the sliding dog 51 there is provided a sliding key 65 mounted in the axle 24 and carrying a rotatable collar 66 also journaled on the axle 24 and formed on its outer periphery with dogs 67 adapted permanently to engage with the long dogs 53a and to be engaged with or disengaged from the ring of internally cut teeth 22c in the cage 22. Between the collar 66 and the key 65 is a ring 65a notched on its face to engage the ends of the key, the other face of such ring forming a thrust bearing for the collar 66. This rotatable collar 66 also has internally formed dog teeth 68 adapted to engage dogs 69 formed on or permanently secured to the axle 24 immediately against the pinion 23. The sliding key 65 is adapted to be operated by the rod 36 in the same manner as was the sliding dog 51. The sliding parts are kept normally so that the cage 22 is united to the pinion 23 for rotation together by means of the spring 53b above described.

Thus it will be seen that, for the direct and close ratio gear changes the sliding key 65 remains in a position in which the cage 22 is connected to the pinion 23, the selector mechanism operating exactly as described in the first example.

For the fourth or extra low gear position, the rod 36 moves the sliding key 65 so that the dogs 67 of the collar 66 disengage from the internally toothed ring 22c in the cage 22, whilst the internally formed dog teeth 68 on the collar engage the dogs 69 on the axle, so that the cage 22 is thus released whilst the pinion 23 is held stationary as the long dogs 53a are still engaged with the external dogs 67 on the collar 66.

For providing a fifth gear ratio, separate control mechanism would preferably be employed for moving the sliding key 65 and its collar 66 in the same way as described for moving the sliding dog 51 (see Fig. 2) so that whilst the collar 66 was in a position to hold the pinion 23 stationary the other selector 49 could be moved to the position shown in Fig. 3 previously required for the high close ratio gear.

The construction of the present invention shown in Fig. 3 embodies several minor features of construction such as locating the pawls of the free wheel mechanism in a groove 20a and extending the cage 22 of the gear train A with an annular flange 22d to locate it against one side of groove for the adjacent pawls. Also, instead of double planet pinions 15, single planet pinions 15a are employed which provides room for the spring 53b which returns the sliding collar 66 but this alteration does not alter the fact that the "increase" gear ratio is greater than the "decrease" gear ratio. Thus in one arrangement the following ratios were obtained, approximately:

1st, 25% reduction
2nd, 10% reduction.
3rd, direct drive.
4th, 11.1% increase.
5th, 33⅓% increase.

The invention is obviously not limited to all the details of construction above described, some of which may be modified without departing from the nature of the invention.

What I claim is:

1. In an epicyclic variable speed gear, in combination, a driving member, a driven member, a fixed axle, first and second epicyclic gear trains each consisting of an annulus gear, a sun gear and a planet carrier with a planet pinion meshing with said sun gear and annulus gear, the planet carrier of said first gear train being integral with the annulus of said second gear train, means connecting the sun gear of said second train to the fixed axle, means connecting the planet carrier of the second gear train to the sun gear of the first gear train, means for disconnecting one of said two connecting means to allow the first gear train to run idle and also for coupling the sun gear of the first gear train to the fixed axle when so disconnecting one of said two connecting means, pawl and ratchet means for coupling the planet carrier of the first gear train to the driven member, second pawl and ratchet means for coupling the annulus of the first gear train to the driven member, driving selector means for coupling the driving member alternatively to the planet carrier of the first gear train or to the annulus of the first gear train in two alternative positions, in one of which positions the driving selector engages the pawls of the second pawl and ratchet means to trip them out of engagement with the ratchet.

2. In an epicyclic variable speed gear, in combination, a driving member, a driven member, a fixed axle, first and second epicyclic gear trains, each consisting of an annulus gear, a sun gear and a planet carrier with a planet pinion meshing with said sun gear and annulus gear, the planet carrier of the first gear train being integral with the annulus of the second gear train, the sun gear of the first gear train being integral with the planet carrier of the second gear train, selector means for alternatively coupling said first or said second sun gear to the fixed axle, pawl and ratchet means for coupling the planet carrier of the first gear train to the driven member, second pawl and ratchet means for coupling the annulus of the first gear train to the driven member, driving selector means for coupling the driving member alternatively to the planet carrier of the first gear train or to the annulus of the first gear train in two alternative positions, in one of which positions the driving selector engages the pawls of the second pawl and ratchet means to trip them out of engagement with the ratchet.

3. In an epicyclic variable speed gear, in combination, a driving member, a driven member, a fixed axle, first and second epicyclic gear trains, each consisting of an annulus gear, a sun gear and a planet carrier with a planet pinion meshing with said sun gear and annulus gear, the planet carrier of said first gear train being integral with the annulus gear of said second gear train and the sun gear of said first gear train being selectively engageable and disengageable to the planet carrier of said second gear train, the sun member of the second gear train being keyed to said fixed axle, selector means for coupling said first sun gear alternatively to said fixed axle or to the planet carrier of said second gear train, pawl and ratchet means for coupling the planet carrier of the first gear train to the driven member, second pawl and ratchet means for coupling the annulus of the first gear train to the driven member, driving selector means for coupling the driving member alternatively to the planet carrier of the first gear train or to the annulus of the first gear train in two alternative positions, in one of which positions the driving selector engages the pawls of the second pawl and ratchet means to trip them out of engagement with the ratchet.

4. An epicyclic change speed gear according to claim 1, further characterised in that the said disconnectable coupling is arranged between the said second planet carrier and the said sun pinion of the first epicyclic gear train, said disconnectable coupling comprising a sliding selector member permanently coupled to the first sun pinion, alternative sets of dogs on said sliding selector members, sets of dogs on the second planet carrier and stationary member, each complementary to one of said alternative sets of dogs, and means for moving said sliding selector member to alternative positions for engagement of one of its alternative sets of dogs and disengagement of the other of its alternative sets of dogs with their complementary sets of dogs.

5. An epicyclic change speed gear according to claim 1, further characterised in that the said disconnectable coupling is arranged between the said second planet carrier and the said sun pinion of the first epicyclic gear train, said disconnectable coupling comprising a sliding selector member permanently coupled to the first sun pinion, alternative sets of dogs on said sliding selector member, sets of dogs on the second planet carrier and stationary member, each complementary to one of said alternative sets of dogs, and means for moving said sliding selector member to alternative positions for engagement of one of its alternative sets of dogs and disengagement of the other of its alternative sets of dogs with their complementary sets of dogs, said means for selectively coupling the driving member to the planet carrier or annulus of the first epicyclic gear train comprising a slidable driving selector permanently coupled to the driving member, operating means for sliding said driving selector to its alternative coupling position and lost motion means connecting said operating means to the slidable driving selector and to the sliding selector of the disconnectable coupling so that while the driving selector is engaged with the annulus of the first gear train and the driven member is engaged with the planet carrier of the first gear train, the said operating means is movable to position the sliding selector of the disconnectable coupling in either of its alternative positions.

WILLIAM BROWN.

REFERENCES CITED

The following references are of record in the file of this patent:

UNITED STATES PATENTS

| Number | Name | Date |
|---|---|---|
| 1,045,238 | Winkler | Nov. 26, 1912 |
| 2,168,600 | Brown | Aug. 8 1939 |
| 2,301,852 | Brown | Nov. 10, 1939 |

FOREIGN PATENTS

| Number | Country | Date |
|---|---|---|
| 5,988 | Great Britain | Dec. 11, 1913 |
| 13,728 | Great Britain | June 12, 1912 |
| 221,146 | Switzerland | Aug. 1, 1942 |